US010081063B2

(12) United States Patent
Shi et al.

(10) Patent No.: US 10,081,063 B2
(45) Date of Patent: *Sep. 25, 2018

(54) EXPANDING LOCATING PIN WITH CONTROLLED HOLDING FORCE

(71) Applicant: GM GLOBAL TECHNOLOGY OPERATIONS LLC, Detroit, MI (US)

(72) Inventors: Jianying Shi, Oakland Township, MI (US); Scott A. McLeod, Windsor (CA); Justin Jay Hackett, Mount Clemens, MI (US); John Patrick Spicer, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 367 days.

This patent is subject to a terminal disclaimer.

(21) Appl. No.: 14/830,287

(22) Filed: Aug. 19, 2015

(65) Prior Publication Data

US 2017/0050245 A1 Feb. 23, 2017

(51) Int. Cl.
*B23B 31/40* (2006.01)
*B23B 31/171* (2006.01)
(Continued)

(52) U.S. Cl.
CPC .......... *B23B 31/40* (2013.01); *B23B 31/1612* (2013.01); *B25B 5/087* (2013.01);
(Continued)

(58) Field of Classification Search
CPC ... B23B 31/40; B23Q 3/18; B23Q 3/08; B25J 15/10; B25J 15/103; B25J 15/0047
See application file for complete search history.

(56) References Cited

U.S. PATENT DOCUMENTS 2,707,107 A * 4/1955 Tucker ............... B23K 3/08
279/106
2,723,861 A * 11/1955 Eisler ............... B23B 31/1269
279/106
(Continued)

FOREIGN PATENT DOCUMENTS

CN 1693018 A 11/2005
CN 1962117 A 5/2007
(Continued)

OTHER PUBLICATIONS

Goudsmit Magnetic Systems, brochure entitled "Magnet Grippers"; accessed Aug. 14, 2014; 4 pages.

*Primary Examiner* — Christopher M Koehler
*Assistant Examiner* — Seahee Yoon
(74) *Attorney, Agent, or Firm* — Quinn IP Law

(57) ABSTRACT

An expanding locating pin assembly configured to locate and hold a part includes a housing, a locating pin, an actuating mechanism, and a controller. The housing is configured with a plurality of radial jaw guides and a part rest face. The locating pin has a plurality of jaws connected to and radially movable in the radial jaw guides and extending past the part rest face. The actuating mechanism synchronously moves the jaws to a radial position and applies a holding force to the part. The controller controls the radial position and the holding force of the jaws. The part rest face of the housing and the jaws of the locating pin are configured to receive the part in a located position. The jaws of the locating pin are configured to hold the part in the located position via the holding force and a friction force resulting from the holding force.

17 Claims, 3 Drawing Sheets

(51) Int. Cl.
*B25J 15/00* (2006.01)
*B25B 5/08* (2006.01)
*B25B 31/00* (2006.01)
*B23B 31/12* (2006.01)
*B25J 15/10* (2006.01)
*G11B 17/028* (2006.01)

(52) U.S. Cl.
CPC ........... *B25B 31/005* (2013.01); *B25J 15/009* (2013.01); *B23B 31/1253* (2013.01); *B25J 15/10* (2013.01); *G11B 17/0282* (2013.01)

(56) References Cited

U.S. PATENT DOCUMENTS

| | | | | |
|---|---|---|---|---|
| 3,514,116 | A * | 5/1970 | Brinkman | B23B 31/4006 279/131 |
| 4,627,288 | A * | 12/1986 | Guzik | G11B 17/0287 360/99.06 |
| 5,323,379 | A * | 6/1994 | Kim | G11B 17/0282 369/264 |
| 5,836,633 | A * | 11/1998 | Svensson | B23B 13/02 294/202 |
| 5,884,951 | A * | 3/1999 | Long | B25J 15/0206 294/106 |
| 6,494,516 | B1 * | 12/2002 | Bertini | B23P 19/084 294/119.1 |
| 6,637,756 | B2 * | 10/2003 | McCurry | B23B 31/1253 279/61 |
| 7,029,000 | B2 * | 4/2006 | Petit | B25B 5/087 269/32 |
| 8,303,009 | B2 * | 11/2012 | Hoellriegl | B65G 47/90 294/195 |
| 8,671,533 | B2 * | 3/2014 | Haag | B23B 31/16241 269/20 |
| 8,985,656 | B2 * | 3/2015 | Maffeis | B25J 15/0028 294/119.1 |
| 2010/0140882 | A1 | 6/2010 | McCormick et al. | |
| 2010/0252610 | A1 * | 10/2010 | Viola | A61B 17/07207 227/177.1 |
| 2011/0089709 | A1 * | 4/2011 | Neeper | B25J 9/102 294/119.1 |
| 2013/0106127 | A1 | 5/2013 | Lipson et al. | |
| 2013/0292914 | A1 * | 11/2013 | Pienta | B23B 31/40 279/2.19 |
| 2014/0112744 | A1 * | 4/2014 | Bauch | B21D 43/06 414/226.02 |
| 2014/0138971 | A1 * | 5/2014 | Xie | B25J 15/0047 294/195 |
| 2014/0265400 | A1 * | 9/2014 | Gorham | B25J 15/10 294/195 |
| 2015/0336277 | A1 * | 11/2015 | Schanz | B25J 15/0047 294/97 |
| 2016/0278872 | A1 * | 9/2016 | Gombert | B25J 15/028 |
| 2017/0050246 | A1 * | 2/2017 | Shi | B23B 31/40 |

FOREIGN PATENT DOCUMENTS

| | | |
|---|---|---|
| CN | 101193720 A | 6/2008 |
| CN | 201357240 Y | 12/2009 |
| CN | 201423577 Y | 3/2010 |
| CN | 201483250 U | 5/2010 |
| CN | 102121496 A | 7/2011 |
| CN | 103659007 A | 3/2014 |
| EP | 2025293 A1 | 2/2009 |

* cited by examiner

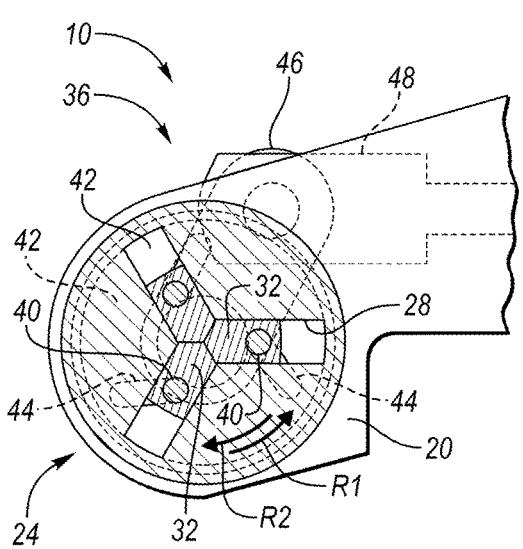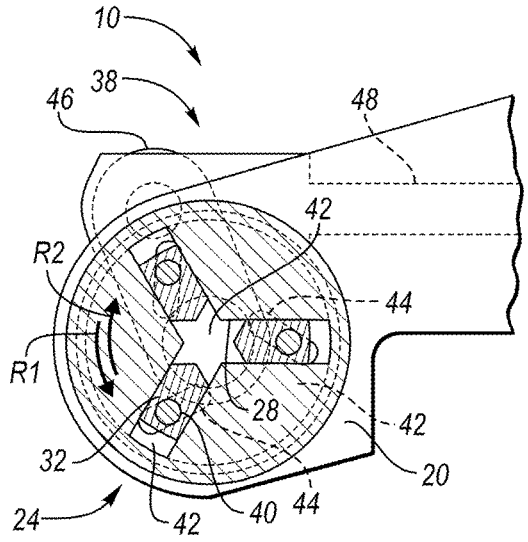
FIG. 4A  FIG. 4B
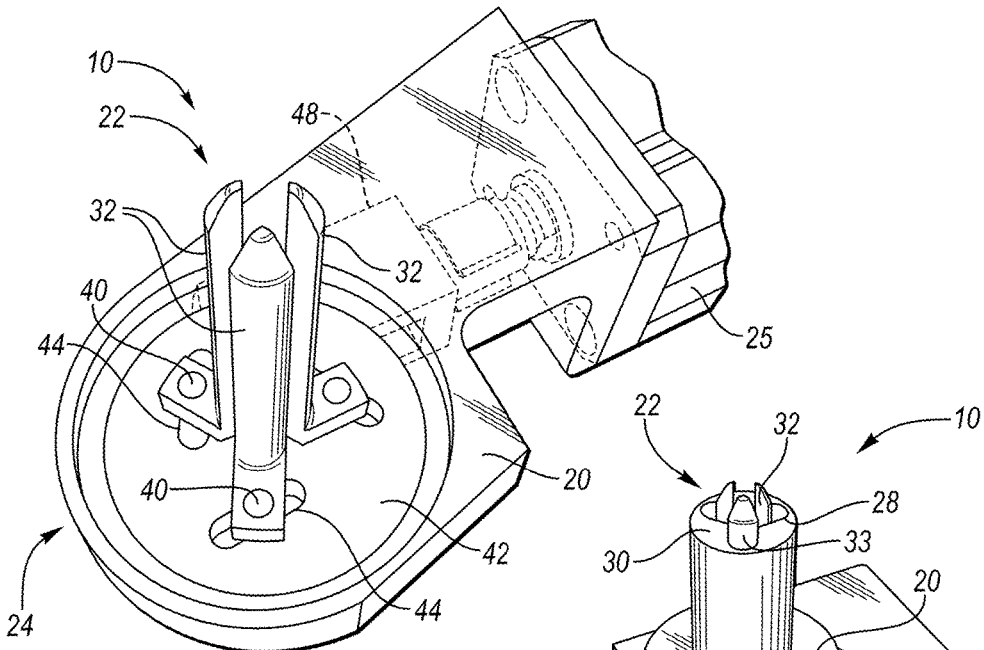
FIG. 5
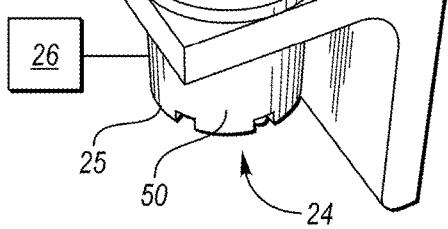
FIG. 6

EXPANDING LOCATING PIN WITH CONTROLLED HOLDING FORCE

TECHNICAL FIELD

This disclosure relates to an expanding locating pin with controlled holding force.

BACKGROUND

A manufacturing system typically operates on parts, subassemblies, and/or assemblies that must be accurately located and held in place for manufacturing and assembly operations. For example, a sheet metal part, subassembly, or assembly may need to be accurately located and held in place to conduct assembly, welding, and inspection operations in the body shop of a vehicle assembly plant.

Part locating fixtures are normally used for this purpose. Part locating fixtures typically include a plurality of fixed pins that are configured to fit into a plurality of locating holes in the part and one or more clamps that are configured hold the part in place. The locating holes may have various sizes and/or shapes. Part locating fixtures are generally useable for only one particular part size and/or shape and usually need to be modified or rebuilt to locate and hold a differently sized and/or shaped part. Multiple part locating fixtures are typically required for the wide variety of parts and the wide variety of assembly and manufacturing operations in a manufacturing plant.

SUMMARY

An expanding locating pin assembly and a flexible manufacturing system are provided herein. The expanding locating pin assembly is configured to locate a part with locating holes of various sizes. The expanding locating pin assembly includes a housing, a locating pin, an actuating mechanism, and a controller. The housing is configured with a plurality of radial jaw guides and a part rest face. The locating pin has a plurality of jaws. Each jaw is connected to and radially movable in one of the radial jaw guides and extends from the part rest face. The actuating mechanism is connected to the housing and the jaws and is configured to synchronously move the jaws to a radial position. The controller is connected to the actuating mechanism and is configured to control the radial position of the jaws. The part rest face of the housing and the jaws of the locating pin are configured to receive the part in a located position. The housing may be configured with three jaw guides, and the locating pin may have three jaws.

A second embodiment of the expanding locating pin assembly is configured to locate a part with locating holes of various sizes and hold the part with a controlled holding force. The expanding locating pin assembly includes a housing, a locating pin, an actuating mechanism, and a controller. The housing is configured with a plurality of radial jaw guides and a part rest face. The locating pin has a plurality of jaws. Each jaw is connected to and radially movable in one of the radial jaw guides and extends from the part rest face. The actuating mechanism is connected to the housing and the jaws and is configured to synchronously move the jaws to a radial position and to apply the holding force to the part. The controller is connected to the actuating mechanism and is configured to control the radial position of the jaws and the holding force of the jaws on the part. The part rest face of the housing and the jaws of the locating pin are configured to receive the part in a located position. The jaws of the locating pin are configured to hold the part in the located position via the holding force and a friction force resulting from the holding force. The housing may be configured with three jaw guides, and the locating pin may have three jaws.

The flexible manufacturing system is configured for manufacturing one or more of a part, a subassembly, and an assembly each having various configurations and locating holes of various sizes. The flexible manufacturing system includes an expanding locating pin assembly configured to locate and hold one of the part, the subassembly, and the assembly in a located position. The expanding locating pin assembly includes a housing, a locating pin, an actuating mechanism, and a controller. The housing is configured with a plurality of radial jaw guides and a part rest face. The locating pin has a plurality of jaws. Each jaw is connected to and radially movable in one of the radial jaw guides and extends from the part rest face. The actuating mechanism is connected to the housing and the jaws and is configured to synchronously move the jaws to a radial position and to apply the holding force to the one of the part, the subassembly, and the assembly. The controller is connected to the actuating mechanism and is configured to control the radial position of the jaws and the holding force of the jaws. The part rest face and the jaws of the locating pin are configured to receive the one of the part, the subassembly, and the assembly in the located position. The jaws of the locating pin are configured to hold the one of the part, the subassembly, and the assembly in the located position via the holding force and a friction force resulting from the holding force. The housing may be configured with three jaw guides, and the locating pin may have three jaws.

The expanding locating pin assembly and the flexible manufacturing system enable parts, subassemblies, and/or assemblies having various configurations and locating holes of various sizes to be located and held in place for manufacturing and assembly operations. This disclosure applies to any machine or manufacture that locates any item, including but not limited to parts, subassemblies, assemblies, for any purpose. This disclosure applies to any manufacturing system, including but not limited to manufacturing systems for vehicles and other transportation products, industrial products, construction products, consumer products, and government products.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 4A is a schematic cross-sectional illustration, partially in elevation, of the expanding locating pin assembly of FIG. 1A, taken at line 4-4 of FIG. 2, with the plurality of jaws at the minimum diameter radial position.

FIG. 4B is a schematic cross-sectional illustration, partially in elevation, of the expanding locating pin assembly of FIG. 1A, taken at line 4-4 of FIG. 2, with the plurality of jaws at the maximum diameter radial position.

FIG. 5 is a fragmentary schematic perspective view illustration of the expanding locating pin assembly of FIG. 1A with an upper portion of a housing removed for clarity.

FIG. 6 is schematic perspective view of an alternative embodiment of the expanding locating pin assembly of FIG. 1A.

DETAILED DESCRIPTION

Figure 1A:
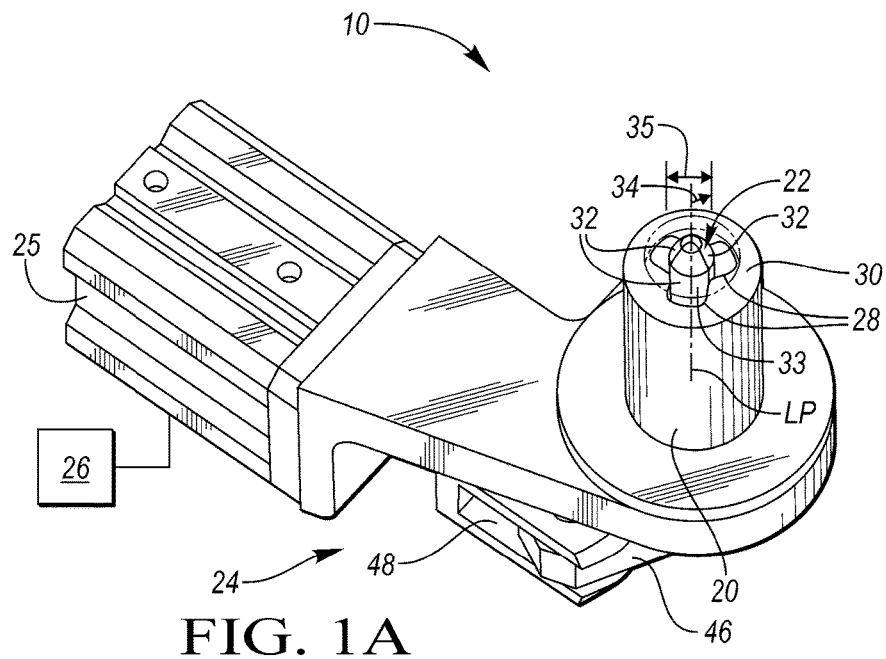
FIG. 1A is a schematic perspective illustration of an expanding locating pin assembly with a plurality of jaws at a minimum diameter radial position.
Figure 1B:
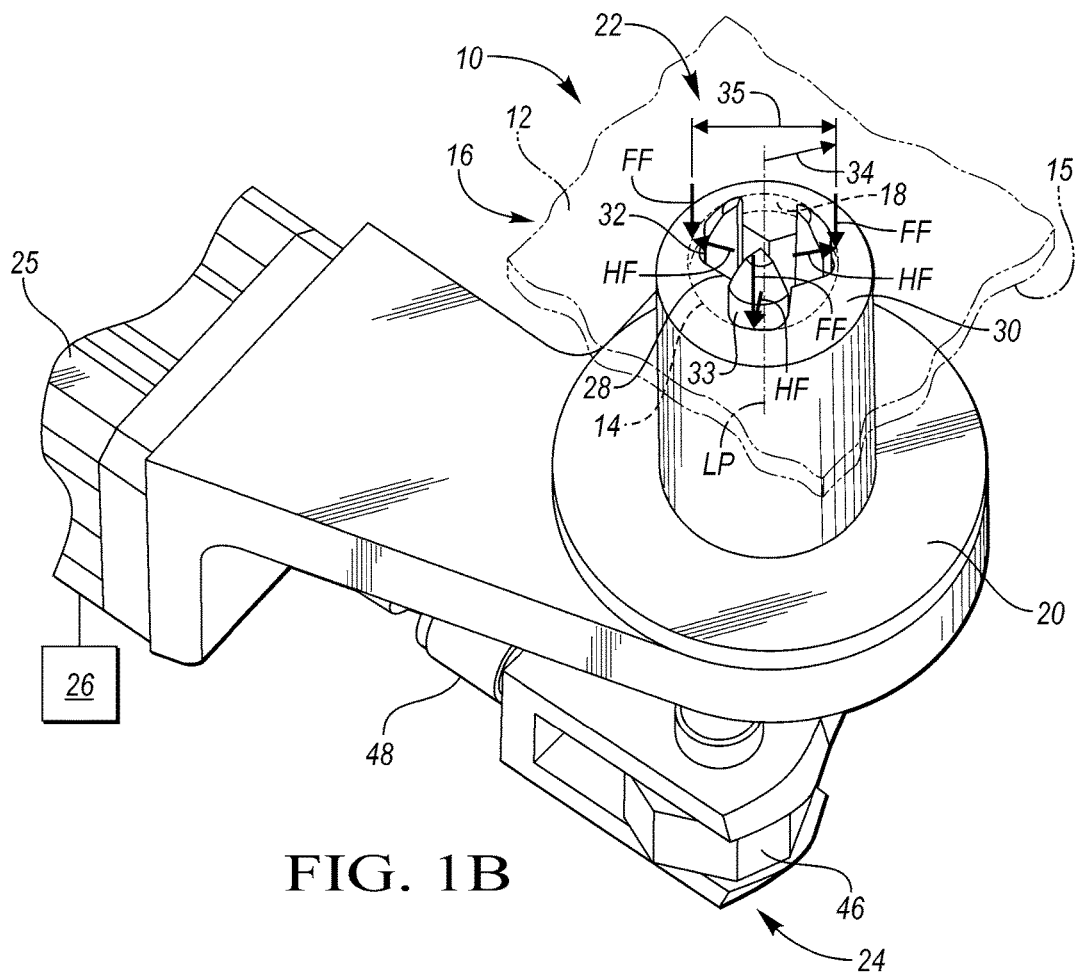
FIG. 1B is a schematic perspective illustration of the expanding locating pin assembly of FIG. 1A including a part that is located and held in a located position by the expanding locating pin assembly.

Referring to the drawings, wherein like reference numbers refer to like components throughout the views, FIG. 1A-1B shows an expanding locating pin assembly 10 for use in a flexible manufacturing system (not shown). The flexible manufacturing system is configured for manufacturing and/or assembling one or more of a part, subassembly, or assembly 12 each having various size and shape configurations and each configured with one or more locating holes 14 of various sizes. The locating holes 14 have an edge 18. The part, subassembly, or assembly 12 has a locating surface 15. The part 12 may need to be accurately located and held in place for manufacturing and assembly operations. For example, a sheet metal part, subassembly, or assembly 12 may need to be accurately located and held in place to conduct assembly, welding, and inspection operations in the body shop of a vehicle assembly plant.

The expanding locating pin assembly 10 is configured to locate the part 12 via the locating hole 14 and the locating surface 15 in a located position 16. The expanding locating pin assembly may also be configured to hold the part 12 with a controlled holding force (arrow HF) in the located position 16. Locating is defined herein as positioning the part 12 in the located position 16 in 3-dimensional space. Holding is defined herein as retaining the part 12 in the located position 16 via the holding force (arrow HF) acting normal to and on the edge 18 of the locating hole 14 and/or via a friction force (arrow FF) resulting from the holding force (arrow HF) and acting parallel to and on the edge 18 of the locating hole 14. Holding, as defined herein, does not include clamping. Clamping is defined herein as compressing the part 12 between two surfaces with a clamping force (not shown) such that movement of the part 12 is prevented by the clamping force and by the interference of the two surfaces with the part 12.

The expanding locating pin assembly 10 may be connected to an immovable structure (not shown), or to a moveable device (not shown), including but not limited to a robot, a conveyor, or a guided vehicle. There may be multiple expanding locating pin assemblies 10 included in the flexible manufacturing system and/or in a particular manufacturing or assembly operation in the flexible manufacturing system.

The expanding locating pin assembly 10 includes a housing 20, a locating pin 22, an actuating mechanism 24, and a controller 26. The housing 20 is configured with a plurality of radial jaw guides 28 and a part rest face 30.

The locating pin 22 has a plurality of jaws 32. Each jaw 32 is connected to and radially movable in one of the radial jaw guides 28 and extends out of the housing 20 past the rest face 30. The locating pin 22 has a locating pin axis (axis LP) at its center of symmetry. Each of the jaws 32 has a part holding feature 33 at the radially outer edge of the jaw 32 that is farthest from the locating pin axis (axis LP). The part holding feature 33 of the jaws 32 may be a surface that is parallel to the locating pin axis (axis LP), as shown. The part holding feature 33 of the jaws 32 may be a segment of a cylindrical surface, as shown. The part holding feature 33 of the jaws 32 may be any other suitable feature for applying the holding force (arrow HF) perpendicular to the surface of the edge 18 of the locating hole 14.

The housing 20 may be configured with three radial jaw guides 28 and the locating pin 22 may have three jaws 32 for locating the part 12 when the locating hole 14 is a round hole, as shown. Alternatively, the housing 20 may be configured with two radial jaw guides 28 and the locating pin 22 may have two jaws 32 for locating the part 12 when the locating hole 14 is a slot (not shown).

Continuing to refer to FIGS. 1A-1B, the actuating mechanism 24 is connected to the housing 20 and the jaws 32. The actuating mechanism 24 is configured to synchronously move the jaws 32 to a radial position 34 defining a locating pin circumference 31 and a locating pin diameter 35 and to cause the jaws 32 to apply the holding force (arrow HF) normal to the surface of the edge 18 of the locating hole 14 of the part 12. Radial is defined herein as the direction perpendicular to the locating pin axis (axis LP). The actuating mechanism includes an actuator 25. The actuator 25 may be one of a pneumatic actuator, a hydraulic actuator, and an electric servo motor.

The controller 26 is connected to the actuating mechanism 24 and is configured to control the motion and the radial position 34 of the jaws 32 and to control the holding force (arrow HF) of the jaws 32 on the edge 18 of the locating hole 14 of the part 12. The magnitude of the holding force (arrow HF) may be controlled as appropriate depending on a variety of factors, including but not limited to the material type, the material thickness, the size, and the shape of the part 12.

The part 12 is located in the located position 16 on the part rest face 30 and the jaws 32 of the locating pin 22. The locating surface 15 of the part 12 is in contact with the part rest face 30 of the housing 20 when the part 12 is in the located position 16. In addition, the part holding features 33 of the jaws 32 are in close proximity to the edge 18 of the locating hole 14 when the part 12 is in the located position 16. For example, the part holding features 33 of the jaws 32 may be within 1 mm of the edge 18 of the locating hole 14 when the part 12 I in the located position 16. The part 12 may be held by further expanding the jaws 32 of the expanding locating pin assembly 10 to apply the holding force (arrow HF) after the part 12 is in the located position 16 such that both the holding force (arrow HF) and the friction force (arrow FF) resulting from the holding force (arrow HF) holds the part 12 in the located position 16.

Figure 2:
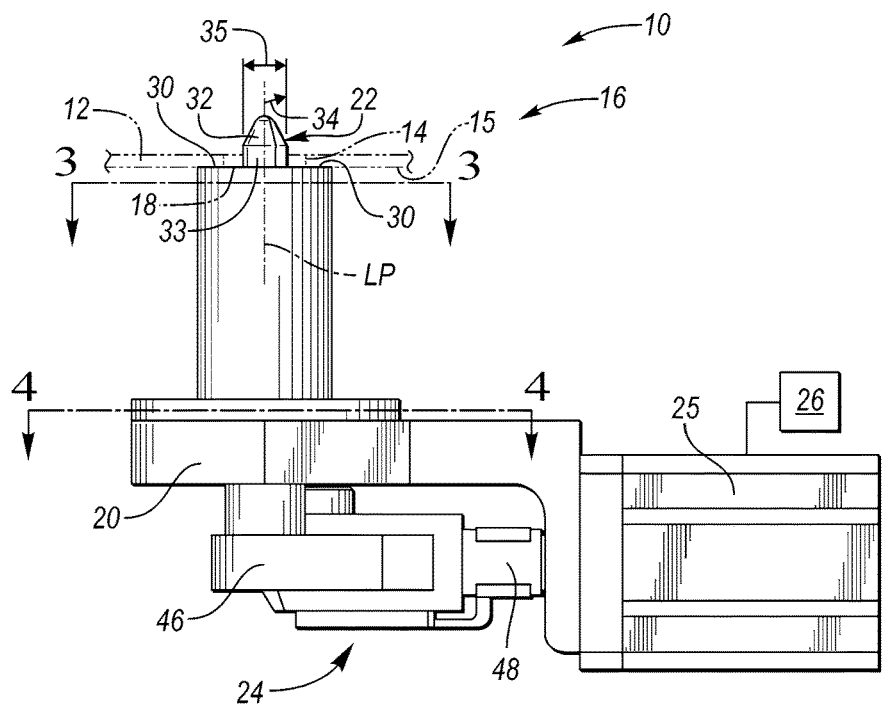
FIG. 2 is a schematic side view of the expanding locating pin assembly of FIG. 1A with the plurality of jaws at the minimum diameter radial position and including the part to be located and held.
Figure 3A:
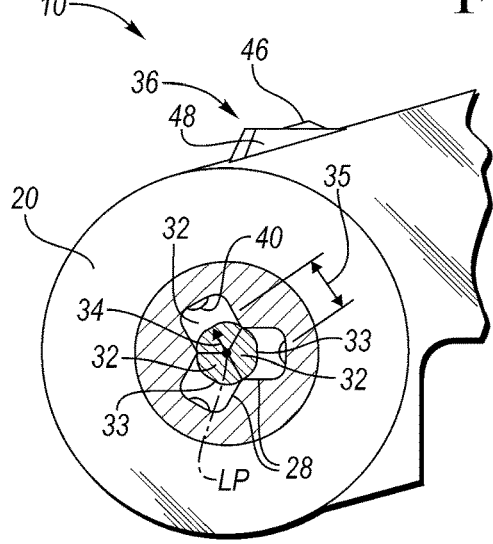
FIG. 3A is a schematic cross-sectional illustration, partially in elevation, of the expanding locating pin assembly of FIG. 1A, taken at line 3-3 of FIG. 2, with the plurality of jaws at the minimum diameter radial position.
Figure 3B:
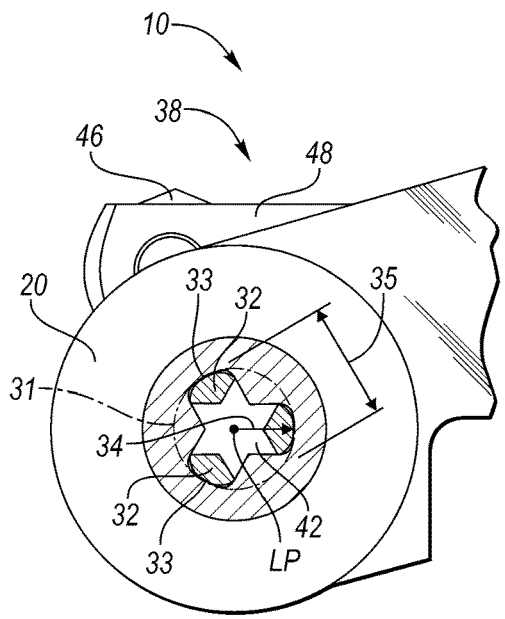
FIG. 3B is a schematic cross-sectional illustration, partially in elevation, of the expanding locating pin assembly of FIG. 1A, taken at line 3-3 of FIG. 2, with the plurality of jaws at a maximum diameter radial position.

Referring now to FIGS. 2-3B, the jaws 32 of the locating pin 22 may be radially moveable from a minimum diameter radial position 36 to a maximum diameter radial position 38. The jaws 32 of the locating pin 22 may be radially moveable to locate and hold parts 12 having locating holes 14 ranging from 6 mm in diameter at the minimum diameter radial position 36 to 20 mm in diameter at the maximum diameter radial position 38. Alternatively, the jaws 32 of the locating pin 22 may be radially moveable to locate and hold parts 12 having locating holes 14 ranging from 20 mm in diameter at the minimum diameter radial position 36 to 40 mm in diameter at the maximum diameter radial position 38. The jaws 32 of the locating pin 22 may be radially movable to locate and hold parts 12 having locating holes 14 of any other appropriate range of diameters, for example 16 mm to 32 mm or 6 mm to 40 mm.

Referring now to FIGS. 4A-5, each jaw 32 may include a jaw positioning pin 40. The actuating mechanism 24 may include a rotating plate 42 configured with a respective jaw positioning slot 44 extending both radially and circumferentially for each jaw positioning pin 40. Each jaw positioning pin 40 may be connected to the respective jaw positioning slot 44 such that rotating the rotating plate 42 in a first radial direction (arrow R1) increases the radial position 34 of the jaws 32 and applies the holding force (arrow HF) and rotating the rotating plate 42 in a second rotation direction (arrow R2), opposite the first rotation direction (arrow R1), decreases the radial position 34 of the jaws 32 and releases the holding force (arrow HF).

The actuating mechanism 24 may include a crank arm 46 connected to the rotating plate 42 and a connecting rod 48 connected to the crank arm 46 and to the actuator 25. The actuator 25, via the connecting rod 48 and the crank arm 46, may cause the rotating plate 42 to rotate in the first rotation direction (arrow R1) to increase the radial position 34 of the jaws 32 and to apply the holding force (arrow HF) and in the second rotation direction (arrow R2), opposite the first rotation direction (arrow R1), to decrease the radial position 34 of the jaws 32 and to release the holding force (arrow HF).

Referring now to FIG. 6, the actuator 25 may be an electric servo motor 50 having an output shaft (not shown) attached to the rotating plate 42. The electric servo motor 50 may cause the rotating plate 42 to rotate in the first rotation direction (arrow R1) to increase the radial position 34 of the jaws 32 and to apply the holding force (arrow HF) and in the second rotation direction (arrow R2), opposite the first rotation direction (arrow R1), to decrease the radial position 34 of the jaws 32 and to release the holding force (arrow HF).

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An expanding locating pin assembly configured to receive and locate a part with locating holes of various sizes, comprising:
    a housing configured with a plurality of radial jaw guides and a part rest face; a locating pin having a locating pin axis and having a plurality of jaws, each jaw connected to and radially movable in one of the radial jaw guides, extending past the part rest face in a direction parallel to the locating pin axis, and including a part holding surface at its radially outer edge;
    an actuating mechanism connected to the housing and the jaws and configured to synchronously move the jaws to a radial position; and
    a controller connected to the actuating mechanism and configured to control the radial position of the jaws;
    wherein the part rest face of the housing and the part holding surfaces of the jaws are configured to receive and locate the part via one of the locating holes in a located position;
    wherein the part holding surface of each jaw is always parallel to the locating pin axis;
    wherein each jaw includes a jaw positioning pin;
    wherein the actuating mechanism includes a rotating plate configured with a respective jaw positioning slot extending both radially and circumferentially for each jaw positioning pin; and
    wherein each jaw positioning pin is connected to the respective jaw positioning slot such that rotating the rotating plate moves the jaws of the locating pin in the radial jaw guides to the radial position.

2. The expanding locating pin assembly of claim 1, wherein the jaws of the locating pin are radially moveable to locate the part with locating holes ranging from 6 mm to 20 mm in diameter.

3. The expanding locating pin assembly of claim 1, wherein the jaws of the locating pin are radially moveable to locate the part with locating holes ranging from 20 mm to 40 mm in diameter.

4. The expanding locating pin assembly of claim 1, wherein the housing is configured with three of the jaw guides; and
    wherein the locating pin has three of the jaws.

5. The expanding locating pin assembly of claim 1, wherein the actuating mechanism includes a crank arm and a connecting rod.

6. The expanding locating pin assembly of claim 1, wherein the actuating mechanism includes a pneumatic actuator.

7. The expanding locating pin assembly of claim 1, wherein the actuating mechanism includes an electric servo motor.

8. An expanding locating pin assembly configured to receive and locate a part with locating holes of various sizes and to hold the part with a controlled holding force, comprising:
    a housing configured with a plurality of radial jaw guides and a part rest face;
    a locating pin having a locating pin axis and having a plurality of jaws, each jaw connected to and radially movable in one of the radial jaw guides, extending past the part rest face in a direction parallel to the locating pin axis, and including a part holding surface at its radially outer edge;
    an actuating mechanism connected to the housing and the jaws and configured to synchronously move the jaws to a radial position and to apply a controlled holding force to the part; and
    a controller connected to the actuating mechanism and configured to control the radial position of the jaws and the holding force;
    wherein the part rest face of the housing and the part holding surfaces of the jaws are configured to receive and locate the part via one of the locating holes in a located position;
    wherein the part rest face of the housing and the part holding surfaces of the jaws are further configured to hold the part in the located position via the holding force and a friction force resulting from the holding force;
    wherein the part holding surface of each jaw is always parallel to the locating pin axis;
    wherein each jaw includes a jaw positioning pin;
    wherein the actuating mechanism includes a rotating plate configured with a respective jaw positioning slot extending both radially and circumferentially for each jaw positioning pin; and wherein each jaw positioning pin is connected to the respective jaw positioning slot such that rotating the rotating plate moves the jaws of the locating pin in the radial jaw guides to the radial position.

9. The expanding locating pin assembly of claim 8, wherein the jaws of the locating pin are radially moveable to locate and hold the part having locating holes ranging from 6 mm to 20 mm in diameter.

10. The expanding locating pin assembly of claim 8, wherein the jaws of the locating pin are radially moveable to locate and hold the part having locating holes ranging from 20 mm to 40 mm in diameter.

11. The expanding locating pin assembly of claim 8, wherein the housing is configured with three of the jaw guides; and
wherein the locating pin has three of the jaws.

12. The expanding locating pin assembly of claim 8, wherein the actuating mechanism includes a crank arm and a connecting rod.

13. The expanding locating pin assembly of claim 8, wherein the actuating mechanism includes a pneumatic actuator.

14. The expanding locating pin assembly of claim 8, wherein the actuating mechanism includes an electric servo motor.

15. The expanding locating pin assembly of claim 8, wherein the part holding surface of the jaws is a segment of a cylindrical surface.

16. A flexible manufacturing system configured for manufacturing one or more of a part, a subassembly, and an assembly each having various configurations and locating holes of various sizes, comprising:
   an expanding locating pin assembly configured to receive, locate, and hold one of the part, the subassembly, and the assembly in a located position, including:
      a housing configured with a plurality of radial jaw guides and a part rest face;
      a locating pin having a locating pin axis and having a plurality of jaws, each jaw connected to and radially movable in one of the radial jaw guides, extending past the part rest face in a direction parallel to the locating pin axis, and including a part holding surface at its radially outer edge;
      an actuating mechanism connected to the housing and the jaws and configured to synchronously move the jaws to a radial position and to apply a controlled holding force to the one of the part, the subassembly, and the assembly; and
      a controller connected to the actuating mechanism and configured to control the radial position of the jaws and the holding force on the one of the part, the subassembly, and the assembly;
   wherein the part rest face of the housing and the part holding surfaces of the jaws are configured to receive and locate the one of the part, the subassembly, and the assembly via one of the locating holes in the located position;
   wherein the part rest face of the housing and the part holding surfaces of the jaws are further configured to hold the one of the part, the subassembly, and the assembly in the located position via the holding force and a friction force resulting from the holding force;
   wherein the part holding surface of each jaw is always parallel to the locating pin wherein the part holding surface of each jaw is always parallel to the locating pin axis;
   wherein each jaw includes a jaw positioning pin;
   wherein the actuating mechanism includes a rotating plate configured with a respective jaw positioning slot extending both radially and circumferentially for each jaw positioning pin; and
   wherein each jaw positioning pin is connected to the respective jaw positioning slot such that rotating the rotating plate moves the jaws of the locating pin in the radial jaw guides to the radial position.

17. The flexible manufacturing system of claim 16, wherein the housing is configured with three of the jaw guides; and
wherein the locating pin has three of the jaws.

\* \* \* \* \*